United States Patent [19]

Nelson

[11] 4,176,163

[45] Nov. 27, 1979

[54] SODIUM OXIDE FUME FOR SULFUR OXIDE REMOVAL

[75] Inventor: Hugh W. Nelson, West Hartford, Conn.

[73] Assignee: Combustion Engineering, Inc., Windsor, Conn.

[21] Appl. No.: 859,764

[22] Filed: Dec. 12, 1977

[51] Int. Cl.$^2$ .................. C01B 17/00; B01D 53/34
[52] U.S. Cl. ................... 423/242; 423/551; 423/421; 65/27
[58] Field of Search ............ 423/242, 243, 244, 200, 423/551, 421; 65/27, 168

[56] References Cited

U.S. PATENT DOCUMENTS

| 1,445,645 | 2/1923 | Reid ................................ 423/200 |
| 2,924,511 | 2/1960 | Reintjes et al. .................. 423/200 |
| 3,880,629 | 4/1975 | Dulin et al. ..................... 423/244 X |
| 3,977,844 | 8/1976 | Van Slyke ....................... 423/244 X |

*Primary Examiner*—O. R. Vertiz
*Assistant Examiner*—Gregory A. Heller

[57] ABSTRACT

Sulfur oxides in the flue gases from a glass furnace are converted to sodium sulfate particles by introducing sodium oxide fume into the hot flue gases immediately downstream of the furnace. The fume is generated by forming a bed of carbonaceous material and sodium carbonate that is caused to react under hot reducing conditions. Sodium gas is thereby produced that burns above the bed to produce sodium oxide fume.

11 Claims, 1 Drawing Figure

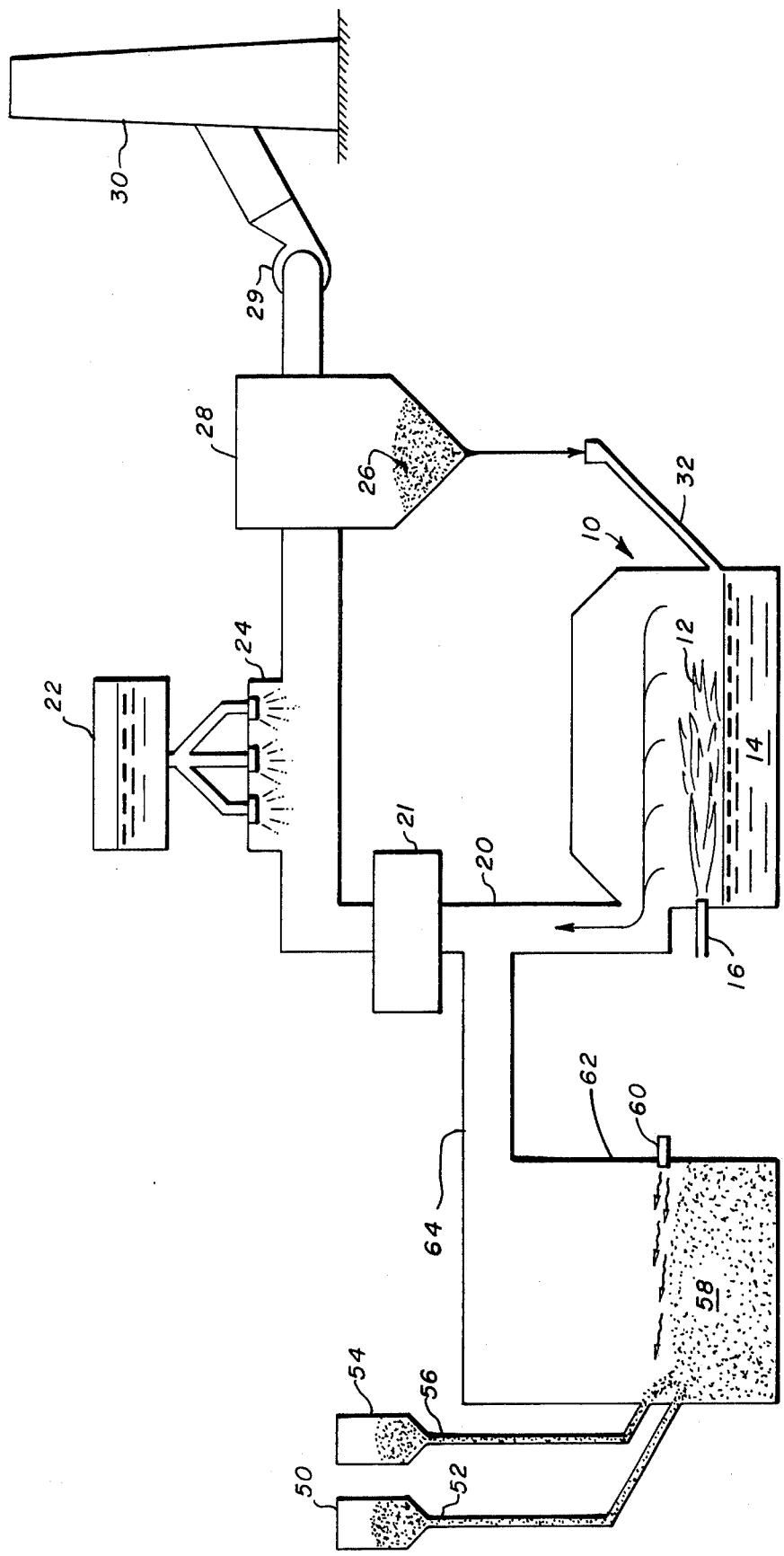

SODIUM OXIDE FUME FOR SULFUR OXIDE REMOVAL

BACKGROUND OF THE INVENTION

The present invention relates to the removal of sulfur dioxide and sulfur trioxide from flue gases, particularly from flue gases emitted from furnaces for the manufacture of glass. In the current regulatory environment, a significant portion of the cost of doing business in many industries is that incurred in complying with the environmental regulations of the jurisdiction in which the industry is operating. In some industries, notably the utility industry, this requirement is a major irritant and may have an effect on profitability, but it is not likely to affect the very survival of a company in the industry. The increased costs are, at least to some extent, passed along to the consumer. There are other industries, however, that do not enjoy this assurance of profitability, and competition from companies in less strict jurisdictions may well force a company in the stricter jurisdiction to go out of business for no other reason than that it has a greater cost of complying with environmental regulations. For example, if a glass company in one jurisdiction is required to use fuel with a lower sulfur content than that which glass companies in adjacent jurisdictions are permitted to use, the difference in fuel costs may well be the deciding factor in the company's survivability. Accordingly, it would be desirable for a glass company in a relatively strict jurisdiction to be able to demonstrate that it is using a process that produces sulfur emissions with a less expensive high-sulfur fuel that are as low as emissions ordinarily encountered with a more expensive lower-sulfur fuel.

A process for achieving this result was proposed in Hirota, U.S. Pat. No. 3,944,650. In Hirota, the flue gases are passed through a waste heat boiler and then through a spray tower having two levels of spray and a glass-fiber demister for wet scrubbing the flue gases. The spray used in the spray tower is an aqueous solution of sodium hydroxide, sodium carbonate, or sodium sulfite, which reacts with the oxides of sulfur in the flue gases to produce sodium sulfate, sodium sulfite, or sodium bisulfite. The solutions are continuously recycled but are periodically removed from the cycle for a rather elaborate course of treating to convert the aqueous sodium sulfite to the solid sodium sulfate used in glass manufacture. It is necessary in the Hirota process that the flue gases be kept saturated, which results in the necessity of using the demister. At the outlet of the desulfurization process, it is also necessary in the Hirota method to reheat the clean wet flue gases in order to provide enough buoyancy for the gases to rise from the stack rather than settle quickly to the ground.

Whatever the operational results in the Hirota method may be, it is apparent that the capital requirements are not inconsiderable. Accordingly, it would appear that the financial advantage gained by using higher-sulfur fuel is somewhat compromised by the capital and operating expenses involved in using the method. It is apparent, therefore, that a method is needed for lowering the sulfur oxide content of glass-furnace flue gases that does not require a large capital investment.

SUMMARY OF THE INVENTION

Accordingly, the present invention is a method and apparatus for lowering the sulfur oxide content of flue gases. A bed consisting essentially of carbonaceous material and sodium carbonate is provided and maintained at a temperature above approximately 1620° F. (882° C.). In addition, the reactants are controlled to result in a reducing environment in the bed, and this results in sodium gas rising from the bed. Oxygen is provided above the bed, which causes sodium oxide fume to be produced, and this fume is added to the flue gases. Resulting reactions produce sodium sulfate particles, which are precipitated out of the flue gases.

According to further refinements of the invention, the bed is kept at temperatures above 1900° F. (1040° C.), preferably at around 2000° F. (1090° C.). Also, when used in conjunction with a glass furnace that uses sodium sulfate as part of the glass-making ingredients, the precipitated particulates can be used as ingredients.

BRIEF DESCRIPTION OF THE DRAWING

These and further features and advantages are described in connection with the attached drawing, which is a diagrammatic representation of the apparatus of the present invention connected to a glass furnace for removal of sulfur oxides from the combustion products of the furnace.

DETAILED DESCRIPTION OF THE PREFERRED EMBODIMENT

The drawing shows a glass-furnace system arranged according to the teachings of the present invention for removal of sulfur oxides from the exhaust gases leaving the furnace. The furnace 10 is the conventional type of glass furnace, in which a flame 12 is produced by spraying oil from an appropriate nozzle 16. The furnace is lined with refractory materials that reflect heat from the flame 12 onto molten glass-making ingredients 14 that occupy the lower portion of the furnace, just below the flame 12. Combustion-product gases leave the furnace 10 by means of an appropriate flue 20. The flue 20 directs the combustion-product gases through a heat exchanger 21, a water quench 24, a precipitator 28, and an induced-draft fan 29 to a stack 30 that releases the gases to the atmosphere.

The heat exchanger 21 is of the rudimentary type usually found in such systems; it recovers some heat from the gases, but further cooling is normally required if the temperature of the gases is to be appropriate for proper functioning of the precipitator 28. The further cooling is accomplished by the water quench 24, in which water from a water tank 22 that communicates with the water quench 24 is sprayed into the gases. The water is vaporized, cooling the gases to the appropriate temperature, and the cooled gases proceed on to the precipitator 28 for particulate removal. The gases from which particulates have been removed are propelled out the stack 30 by the induced-draft fan 29.

The oil used to feed the flame 12 typically contains some sulfur, and the combustion of the oil therefore produces some oxides of sulfur. These oxides are undesirable pollutants, but they are not removed by the precipitator 28, because they are in gaseous, rather than particulate, form. According to the present invention, the sulfur oxides are converted to sodium sulfate particles so that sulfur removal may be accomplished in the precipitator.

The means for performing the conversion to particulate form includes a sodium oxide fume generator, which comprises a furnace-like generator housing 62 in which sodium oxide is generated. The housing would normally be lined with water tubes or refractory material. A hopper 50 supplies carbonaceous material to the generator by means of a conduit 52 that brings the hopper 50 into communication with the interior of the reactor, continuously feeding carbonaceous material to a bed 58 formed in the bottom of the generator. The carbonaceous matter can be chosen from a wide variety of materials. Lampblack, coal, coke, oil, carbon monoxide, vegetable and other organic materials, and lignite are among the materials suitable for the purpose. Lignite appears especially suitable due to its high sodium content, substantial heating value, and low cost.

A second hopper 54 feeds sodium carbonate or materials that form it on combustion to the bed 58 by means of a conduit 56 that provides communication between the second hopper 54 and the interior of the generator. The sodium carbonate can be purchased as industrial-grade chemical, but it is also possible to derive the sodium carbonate from other sources such as the spent pulping liquors from a pulping operation. The spent pulping liquors from the soda process, for instance, would be suitable feed for the generator. The liquors contain sodium salts of organic acids, and these salts burn in the hot bed 58 to produce sodium carbonate. In order to maintain a high bed temperature, it is best if the liquors are dried before they are fed to the bed 58. The use of spent pulping liquors has the advantage that it eliminates the need for a separate carbon supply; the liquors have a high enough carbon content to supply the carbon requirements of the bed operation.

Due to the sulfur content of kraft liquors, their use would not be preferred, but they are suitable in principle as feed for the fume generator.

Appropriate means 60 are provided for blowing air over the surface of the bed 58, and a duct 64 is provided for feeding the gaseous products of the bed reactions to the glass-furnace flue 20 immediately downstream of the furnace 10.

In operation, the reactants are introduced from the hoppers to form the bed 58. Air is introduced by means 60, and the carbon in the carbonaceous material burns to form carbon dioxide or carbon monoxide. The amount of air introduced is used to control the bed temperature. The heat liberated by this reaction and others in the generator is imparted to the sodium carbonate in the bed, which is in equilibrium with sodium oxide and carbon dioxide. High temperatures favor the production of the sodium oxide, and at the temperatures maintained in the bed, around 2000° F. (1090° C.), a significant amount of massive sodium oxide is produced in the bed interior. The air is introduced at a rate below that required to provide a stoichiometrically sufficient amount of oxygen for combustion of the carbon, so reducing conditions are present in the bed interior. As a result, the massive sodium oxide is reduced by carbon in the bed to elemental sodium, which is a diatomic gas at the bed temperature. The sodium gas rises above the bed 58 and promptly burns in the oxygen present in the air blown over the bed surface. This produces extremely fine solid particles of sodium oxide fume.

The air is introduced directly above the bed. Some of it sweeps the bed surface, thereby supporting combustion of some of the carbon. By control of the air-supply rate, a reducing environment and a high temperature are maintained in the bed. These conditions are important for proper operation of the generator; the high temperature favors sodium oxide production, and the presence of reducing conditions, of course, favors the sodium oxide reduction.

The temperature maintained in the bed has been specified as being around 2000° F. (1090° C.). This temperature or one even higher is preferred, but the process can be carried out, though less advantageously, at lower temperatures. There is a preference for temperatures above 1900° F. (1040° C.) because the equilibrium constant in the reduction reaction of sodium oxide and carbon to produce sodium gas exceeds unity at those temperatures. However, sodium will still be produced at temperatures lower than 1900° F., and the only requirement is that the sodium produced be in the gaseous state so that it can reach the relatively oxygen-rich region immediately above the bed. This would suggest that bed temperatures not be allowed to drop far below 1620° F. (880° C.), the boiling point of sodium.

As a result of the reactions in the generator, sodium oxide fume issues through the duct 64 into the flue 20. Due to the manner in which they are produced, the fume particles are in an extremely fine state of division, so the fume has a very high surface area per unit mass. It therefore offers a large amount of surface for reaction with the hot sulfur oxide gas present in the flue. As a result, the sulfur is rapidly fixed in sodium sulfate particles that can be precipitated out by the precipitator 28. Any excess sodium oxide fume recombines with carbon dioxide in the flue gas to form sodium carbonate fume. Since both sodium sulfate and sodium carbonate are typical glass-making ingredients, they can be reclaimed for use in the glass batch, as suggested by element 32. The presence of sodium carbonate particles in the flue gas reduces the tenacity with which ash sticks to precipitator surfaces, so an excess of sodium oxide is recommended even if recycling to the glass batch is not intended.

Though the reactants are shown as introduced from two hoppers, it may be preferred to intermingle the reactants mechanically prior to introduction. As previously mentioned, some sources of feed chemicals, such as spent pulping liquors, would already have the reactants intermixed to a degree. It is thus apparent that a large number of alterations of the embodiment shown can be made by changing the sources of carbonaceous materials and sodium carbonate. It is also apparent that the provision of sodium carbonate does not have to be effected by feeding sodium carbonate itself to the bed. Sodium salts of organic acids, for instance, are also suitable as the source of sodium, the only requirement of the sodium source being that it should react in the bed to liberate sodium gas. Another modification that may be desired is the provision of the secondary-air source spaced somewhat above the bed in order to convert all of the carbon monoxide given off by the bed to carbon dioxide.

These and other modiciations could be made without departing from the spirit of the invention, and it is meant to include these and all other such modifications and variations as fall within the scope of the appended claims.

What is claimed is:

1. A method of reducing the sulfur oxide content of flue gases containing sulfur oxides, comprising the steps of:

a. providing a bed consisting essentially of carbonaceous material and sodium carbonate;
   b. maintaining a reducing environment and a temperature above approximately 1620° F. (880° C.) in the bed, thereby producing sodium gas that rises from the bed;

c. supplying oxygen to the surface of the bed, thereby allowing the sodium gas to react to produce sodium oxide fume;

d. adding the sodium oxide fume to the flue gas, thereby converting oxides of sulfur to sodium sulfate; and e. precipitating the sodium sulfate particles from the flue gas.

2. A method as recited in claim 1, wherein the bed is maintained at a temperature above 1900° F. (1040° C.).

3. A method as recited in claim 2, wherein the bed is maintained at a temperature of approximately 2000° F. (1090° C.).

4. A method as recited in claim 1, wherein the flue gases are produced in a glass furnace in which glass-making ingredients, including sodium sulfate, are heated, further comprising the step of using the precipitated sodium sulfate particles as part of the glass-making ingredients.

5. A method as recited in claim 4, wherein the glass-making ingredients include sodium carbonate, and wherein the sodium oxide is added at a rate sufficient to produce sodium carbonate particles, sodium carbonate particles thereby being removed in the precipitation step, further comprising the step of using the precipitated sodium carbonate as part of the ingredients.

6. A method as recited in claim 1, wherein the step of providing the bed includes feeding sodium salts of organic acids to the bed, thereby allowing the salts to burn to produce sodium carbonate in the bed.

7. A method as recited in claim 6, wherein the step of providing the bed includes feeding spent sodium-containing pulping liquors to the bed, thereby supplying carbonaceous material to the bed and allowing sodium salts of organic acids to burn to produce sodium carbonate in the bed.

8. A method as recited in claim 7, wherein the bed is maintained at a temperature above 1900° F. (1040° C.).

9. A method as recited in claim 8, wherein the bed is maintained at a temperature of approximately 2000° F. (1090° C.).

10. A method as recited in claim 7, wherein the flue gases are produced in a glass furnace in which glass-making ingredients, including sodium sulfate, are heated, further comprising the step of using the precipitated sodium sulfate particles as part of the glass-making ingredients.

11. A method as recited in claim 10, wherein the glass-making ingredients include sodium carbonate and wherein the sodium oxide is added at a rate sufficient to produce sodium carbonate particles, sodium carbonate particles thereby being removed in the precipitation step, further comprising the step of using the precipitated sodium carbonate as part of the ingredients.

* * * * *